United States Patent
Fukushima et al.

(10) Patent No.: US 7,468,764 B2
(45) Date of Patent: Dec. 23, 2008

(54) LIQUID CRYSTAL DISPLAY PANEL AND LIQUID CRYSTAL DISPLAY APPARATUS

(75) Inventors: Hiroshi Fukushima, Yamatokoriyama (JP); Koji Yabuta, Kashiba (JP); Tomoo Takatani, Nara (JP); Masakazu Wada, Kyoto (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 10/598,952

(22) PCT Filed: Mar. 15, 2005

(86) PCT No.: PCT/JP2005/004528
§ 371 (c)(1),
(2), (4) Date: Apr. 11, 2007

(87) PCT Pub. No.: WO2005/091060
PCT Pub. Date: Sep. 29, 2005

(65) Prior Publication Data
US 2007/0242185 A1    Oct. 18, 2007

(30) Foreign Application Priority Data
Mar. 18, 2004    (JP)    ............................. 2004-079230

(51) Int. Cl.
*G02F 1/1335*    (2006.01)
(52) U.S. Cl. .......................................... 349/67; 385/65
(58) Field of Classification Search ............. 349/65–67
See application file for complete search history.

(56) References Cited
U.S. PATENT DOCUMENTS

| | | | |
|---|---|---|---|
| 6,359,668 B1 | 3/2002 | Iijima et al. | |
| 6,425,675 B2 | 7/2002 | Onishi et al. | |
| 6,768,529 B2 * | 7/2004 | Umemoto et al. | 349/114 |
| 7,027,113 B2 * | 4/2006 | Kim et al. | 349/63 |

(Continued)

FOREIGN PATENT DOCUMENTS

JP    2002-072199 A    3/2002

(Continued)

OTHER PUBLICATIONS

Partial English translation of JP 2003-057645.

(Continued)

*Primary Examiner*—Kevin S Wood
(74) *Attorney, Agent, or Firm*—Keating & Bennett, LLP

(57) ABSTRACT

A first optical-path changing layer is provided, on a front-face side of a rear-face side transparent substrate including a light source on one side face thereof. The first optical-path changing layer has a refractive index substantially equal to that of the transparent substrate, and includes predetermined protrusions and predetermined depressions. Further, a low refractive-index layer is provided on a front-face side of the first optical-path changing layer. The low refractive-index layer is in contact with the protrusions and the depressions of the first optical-path changing layer, and has a smaller refractive index than the refractive index of the first optical-path changing layer. Further, a second optical-path changing layer is provided on a rear-face side of the rear-face side transparent substrate. The second optical-path changing layer includes predetermined protrusions and predetermined depressions.

9 Claims, 4 Drawing Sheets

U.S. PATENT DOCUMENTS

| | | | |
|---|---|---|---|
| 7,030,945 B2 * | 4/2006 | Umemoto et al. | 349/65 |
| 7,265,800 B2 * | 9/2007 | Jagt et al. | 349/61 |
| 7,334,934 B2 * | 2/2008 | Feng et al. | 362/626 |
| 7,355,661 B2 * | 4/2008 | Hong | 349/65 |
| 2001/0053074 A1 | 12/2001 | Onishi et al. | |
| 2003/0043315 A1 | 3/2003 | Umemoto et al. | |

FOREIGN PATENT DOCUMENTS

| | | |
|---|---|---|
| JP | 2003-057645 A | 2/2003 |
| JP | 2003-066443 A | 3/2003 |
| TW | 558019 Y | 10/2003 |
| TW | 573111 B | 1/2004 |
| TW | 574567 B | 2/2004 |

OTHER PUBLICATIONS

International Search Report issued in the corresponding International Application No. PCT/JP2005/004528, mailed on Jul. 5, 2005.

* cited by examiner

LIQUID CRYSTAL DISPLAY PANEL AND LIQUID CRYSTAL DISPLAY APPARATUS

BACKGROUND OF THE INVENTION

1. Field of the Invention

The present invention relates to a liquid crystal display panel and a liquid crystal display apparatus, and in particular, relates to a transmissive/transflective liquid crystal display panel and a transmissive/transflective liquid crystal display apparatus.

2. Description of the Related Art

Currently, liquid crystal display apparatuses are widely used in a display screen of various electronic devices. These liquid crystal display apparatuses are popularly and widely used in electronic devices for various purposes of use, and features of the liquid crystal display apparatuses, including thin-shape, lightness, and low power-consumption, are utilized to the greatest extent.

There is a strong demand, especially in mobile devices exemplified by a mobile phone, for a liquid crystal display apparatus that is thinner in shape, lighter in weight, and lower in power consumption, in view of the circumstance that a user needs to carry a mobile device all the time. As such, techniques have been actively developed for further improvements. This is accompanied by the same strong demand directed to liquid crystal display apparatuses used in the mobile devices. Development of techniques is awaited for a liquid crystal display apparatus that is thinner in shape, lighter in weight, and lower in power consumption.

Conventionally, a liquid crystal display apparatus is often constituted by a combination of a liquid crystal panel including a pair of transparent electrode substrates and a liquid crystal layer, and at least one polarizer. In the case of a transmissive or transflective liquid crystal panel, a pair of polarizers are provided on a face of the respective transparent electrode substrates. On the other hand, in the case of a reflective liquid crystal panel, a polarizer is only provided to a transparent electrode substrate that is provided on an observer side.

The liquid crystal panel adopts a cold-cathode discharge fluorescent lamp, an LED (Light Emitting Diode) or the like as its light source, and the light source is surrounded by a reflector. Light emitted from the light source needs to evenly illuminate a flat face of the liquid crystal panel. Therefore, light from a dot/line light source is changed into two-dimensional luminescence by a light guide. Further, the light source and the light guide are combined with a lens sheet or a diffusion sheet, thereby forming a light unit that has a uniformed in-plane luminance.

The light unit may be provided on a front-face side (observer side) of the liquid crystal panel, which is called frontlight-type, or on a rear-face side of the liquid crystal panel, which is called backlight-type. Currently, both of them are widely used.

However, with the structure in which the liquid crystal panel is combined with such light unit described above, there arises problems in that the thicknesses of a light guide, a lens sheet, and a diffusion sheet, all of which are used in the light unit, not only cause a total thickness of the liquid crystal module to become thicker, but also cause the weight of the liquid crystal module to become heavier. For this reason, it is extremely difficult with the liquid crystal display apparatus constituted by the combination of the liquid crystal panel and the conventional light unit to satisfy the tough demand for a thinner and lighter mobile device.

In view of solving the problems, there are suggested techniques for using a transparent electrode substrate of a liquid crystal panel as a light guide so as to realize a thinner and lighter liquid crystal panel. Such techniques are suggested in, for example, Japanese Unexamined Patent Publications No. 2003-57645 (published on Feb. 26, 2003) and No. 2003-66443 (published on Mar. 5, 2003). Publication No. 2003-57645 teaches a technique (frontlight-type) for using, as a light guide, a transparent electrode substrate that is provided on a front-face side. Publication No. 2003-66443 teaches a technique (backlight-type) for using, as a light guide, a transparent electrode substrate that is provided on a rear-face side. The following describes these conventional techniques.

First, the following describes the technique of frontlight-type taught in publication No. 2003-57645, with reference to FIG. 6.

In the frontlight-type liquid crystal display apparatus of publication No. 2003-57645, the liquid crystal panel is structured in such a way that the liquid crystal layer 103 is provided in a space between a pair of transparent electrode substrates 101 and 102 that sandwich the liquid crystal layer 103, as illustrated in FIG. 6. The transparent electrode substrate 102, which is one of the pair of transparent electrode substrates 101 and 102 that is provided on the observer side, includes a dot/line light source 104 on its end part on a side face. The dot/line light source 104 is realized by an LED, a cold-cathode fluorescent lamp or the like. Further, a polarizer 105 is provided on an outer face of each of the transparent electrode substrates 101 and 102 in the liquid crystal panel.

Further, an optical-path changing layer 106 including protrusions and depressions is provided on a face of the liquid crystal panel, which face is on the observer side. Further, a specular reflection film 107 is provided on a face of the liquid crystal panel, which face is on the rear side.

With the above structure, the function of the light guide is concentrated to the transparent electrode substrate 102 in the liquid crystal display apparatus of publication No. 2003-57645. This makes it possible to reduce the number of components, and thus achieve a thinner shape and a lighter weight.

The following describes the technique of backlight-type taught in publication No. 2003-66443, with reference to FIG. 7.

In the backlight-type liquid crystal display apparatus of publication No. 2003-66443, the liquid crystal panel is structured in such a way that the liquid crystal layer 103 is provided in a space between a pair of transparent electrode substrates 101 and 102 that sandwich the liquid crystal panel, as illustrated in FIG. 7. The transparent electrode substrate 101, which is one of the pair of transparent electrode substrates 101 and 102 that is provided on a rear-face side, includes a dot/line light source 104 at an end part of a side face of the transparent electrode substrate 101. The dot/line light source 104 is realized by an LED, a cold-cathode fluorescent lamp or the like. Further, a polarizer 105 is provided on an outer face of each of the transparent electrode substrates 101 and 102, in the liquid crystal panel.

Further, a low refractive-index layer 116 is provided on a front-face side of the transparent electrode substrate 101 in the liquid crystal panel in such a way that the low refractive-index layer 116 is in contact with the transparent electrode substrate 101. The low refractive-index layer 116 is a layer having a lower refractive index than the refractive index of the transparent electrode substrate 101. Further, a polarizer 117, an optical-path changing layer 117, which includes protrusions and depressions, and a total-reflection film 118 are provided on a rear-face side of the transparent electrode substrate 101. By this way, the transflective liquid crystal display apparatus is realized.

In the above structure, the function of the light guide is concentrated to the transparent electrode substrate 101 in the liquid crystal display apparatus of publication No. 2003-66443. This makes it possible to reduce the number of components, and thus achieve a thinner shape and a lighter weight.

However, the conventional frontlight-type structure of publication No. 2003-57645, in which the transparent electrode substrate provided on the observer side is used as the light guide, has a problem that contrast of a displayed image is degraded. On the other hand, the backlight-type structure of publication No. 2003-66443, in which the transparent electrode substrate provided on the rear-face side is used as the light guide, has a problem that it is not possible to efficiently utilize light emitted from the light source provided on the side face of the transparent electrode substrate, and therefore a bright image cannot be obtained. The following specifically describes these problems.

In the frontlight-type structure of publication No. 2003-57645, the light emitted from the light source 104 provided on the side face of the transparent electrode substrate 102 provided on the front-face side is propagated through the inner part of the transparent electrode substrate 102. Then, the light transmits through the polarizer 105, is reflected totally by an optical-path changing layer 106, which is provided on an upper layer of the polarizer 105 and includes protrusions and depressions. Thereafter, the light enters again the panel, toward the inner part thereof. After reflected by the optical-path changing layer 106, the light transmits through the polarizer 1, then transmits through the transparent electrode substrate 102, and then enters the liquid crystal layer 103. After having transmitted through the liquid crystal layer 103, the light transmits through the transparent electrode substrate 101 provided on the rear-face side. Then, the light is reflected by a specular reflection film 107, which is provided on a back face of the polarizer 105, and then exits toward the observer side.

The path described above is indicated by a path (A) in FIG. 6. Light passing along the path (A) is controlled when exiting the liquid crystal layer 103. By this way, a desired image is displayed.

In the structure of FIG. 6, however, the transparent electrode substrate 102 includes a layer that has a refractive index of approximately 1.5, such as a glass or an alignment layer, and a transparent electrode that has a relatively high refractive index, such as a transparent electrode made of ITO (Indium Tin Oxide). In other words, the transparent electrode substrate 102 has a boundary surface of a multi-layer film where there is a relatively great difference in the refractive indexes. For this reason, after light is emitted from the light source 104, transmitted through the polarizer 105 and the optical-path changing layer 106, and enters again the transparent electrode substrate 102, there may be light that is reflected by any boundary surface of the multi-layer film of the transparent electrode substrate 102 before entering the liquid crystal layer 103, and transmits through the transparent electrode substrate 102 and then through the polarizer 105, as indicated by a path (B) in FIG. 6.

This light is not subject to the control conducted at the liquid crystal layer 103, and therefore becomes excess light leakage. This causes a decrease in the contrast of the displayed image.

On the other hand, in the backlight-type structure of publication No. 2003-66443, the light source 104 is provided on a side face of the transparent electrode substrate 101 provided on the rear-face side. In this structure, after emitted from the light source 104, light is propagated through the inner parts of the transparent electrode substrate 101 and the polarizer 105. Then, the light enters an optical-path changing layer 117, which is provided behind the transparent electrode substrate 101, and then is reflected by a reflection film 118, as indicated by a path (A) in FIG. 7. The light thus reflected by the reflection film 118 is controlled at the liquid crystal layer 103, and then transmits through the transparent electrode substrate 102 and the polarizer 105 that are provided on the observer side. By this way, an image is displayed.

In the structure of FIG. 7, if light directly enters a low refractive-index layer 116 after emitted from the light source 104, the light is reflected totally by the low refractive-index layer 116, as indicated by a path (B) in FIG. 7. As such, the contrast would not be decreased due to excess light leakage.

However, in the case where the light emitted from the light source 104 directly enters the low refractive-index layer 116 and then is reflected totally by the low refractive-index layer 116, the light often exits from a side face of the transparent electrode substrate 101, which side face is opposite to the side face on which the light source 104 is provided. If the light exits from the opposite side face of the transparent electrode substrate 101, the light obviously does not play a role as display light for a displayed image. Accordingly, with the structure of FIG. 7, the loss of light that is emitted from the light source 104 increases, and the light emitted from the light source 104 cannot be utilized efficiently. Thus, it is not possible to display a bright image.

SUMMARY OF THE INVENTION

The present invention is in view of solving the above problems, and has as an object to provide a liquid crystal display panel and a liquid crystal display apparatus that include a liquid crystal panel using a transparent electrode substrate as a light guide so that a thinner shape and a lighter weight are achieved, and a bright and suitable image is displayed without a decrease in display-contrast.

In order to achieve the above object, a liquid crystal display panel according to the present invention is adapted so that the liquid crystal display panel includes a liquid crystal layer filled between a pair of transparent substrates, the liquid crystal display panel further including: a first optical-path changing layer, on a front-face side of a rear-face side transparent substrate, that has a refractive index substantially equal to a refractive index of the rear-face side transparent substrate, and that includes a predetermined protrusion and a predetermined depression, the rear-face side transparent substrate being one of the pair of transparent substrates that is provided on a side which becomes a rear side when an observer views the liquid crystal display panel; a low refractive-index layer, on a front-face side of the first optical-path changing layer, that is in contact with the predetermined protrusion and the predetermined depression of the first optical-path changing layer, and that has a refractive index that is smaller than the refractive index of the first optical-path changing layer; and a second optical-path changing layer, on a rear-face side of the rear-face side transparent substrate, that includes a predetermined protrusion and a predetermined depression.

In the above structure, a liquid crystal display panel employed by a backlight-type liquid crystal display apparatus, in which a light source is provided on a side face of the rear-face side transparent substrate so as to realize a thinner shape, includes, on the front-face side of the rear-face side transparent substrate, the first optical-path changing layer having a predetermined protrusion and a predetermined depression and the low refractive-index layer having a predetermined protrusion and a predetermined depression.

If the protrusion and the depression of the first optical-path changing layer are designed to have appropriate shapes, the following functions are obtained at the interface of the first optical-path changing layer and the low refractive-index layer: (A) a function of carrying out a total reflection with respect to incident light that directly comes from the light source (light that is close to the horizontal), to change the incident light into light that is closer in the direction of the normal line of the substrate; and (B) a function of transmitting incident light that is close to the direction of the normal line of the substrate.

Further, if the protrusion and the depression of the second optical-path changing layer are designed to have appropriate shapes, a function is obtained that a total reflection is carried out with respect to incident light that directly comes from the light source, to change the incident light into light that is closer in the direction of the normal line of the substrate.

Specifically, the light emitted from the light source is first reflected by the protrusion and the depression of the first optical-path changing layer, or the protrusion and the depression of the second optical-path changing layer. At this time, the light, which is close to the horizontal, is changed into light that is closer in the direction of the normal line of the substrate. This prevents the light from exiting via an opposite face to the side face on which the light source is provided, in the rear-face side transparent substrate. Therefore, it becomes possible to reduce the loss of the light emitted from the light source, and display a bright image. After emitted from the light source, light is first reflected by the protrusion and the depression of the first optical-path changing layer. Then, the light is reflected by the protrusion and the depression of the second optical-path changing layer. Thereafter, the light transmits through the protrusion and the depression of the first optical-path changing layer. Finally, the light exits toward the observer side (front-face side).

Additional objects, features, and strengths of the present invention will be made clear by the description below. Further, the advantages of the present invention will be evident from the following explanation in reference to the drawings.

DETAILED DESCRIPTION OF PREFERRED EMBODIMENTS

The following describes embodiments of the present invention, with reference to figures. Note that the present invention is not limited to the embodiments described below.

Embodiment 1

Figure 1:
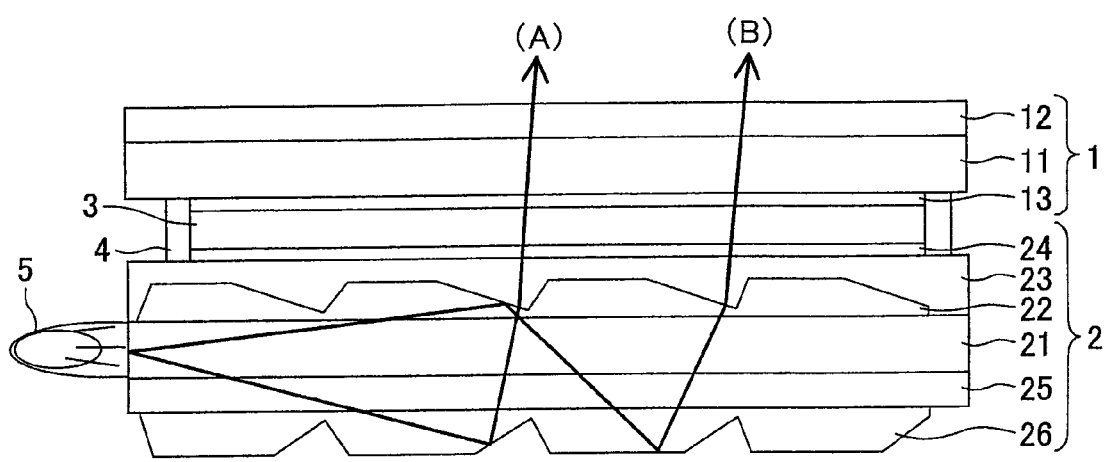
FIG. 1 illustrates an embodiment of the present invention, and is a cross sectional diagram schematically illustrating a structure of a liquid crystal display apparatus according to Embodiment 1.

FIG. 1 is a cross sectional diagram schematically illustrating a structure of a liquid crystal display apparatus according to Embodiment 1. The liquid crystal display apparatus employs a liquid crystal display panel in which a liquid crystal layer 3 is provided in a space between a front substrate section 1 and a rear substrate section 2 that sandwich the liquid crystal layer 3. A light source 5, a driving circuit (not illustrated), and other components are provided to the liquid crystal display panel. By this way, the liquid crystal display apparatus is realized.

In the front substrate section 1, a polarizer 12 is provided on a front-face side of transparent substrate 11, and a transparent electrode 13 is provided on a rear-face side of the transparent substrate 11.

In the rear substrate section 2, a first optical-path changing layer 22, a low refractive-index layer 23, and a transparent electrode 24 are provided, in the order as listed, on a front-face side of a transparent substrate (rear-face side transparent substrate) 21, while a polarizer 25 and a second optical-path changing layer 26 are provided, in the order as listed, on a rear-face side of the transparent substrate 21. In the rear substrate section 2, each of the first optical-path changing layer 22 and the second optical-path changing layer 26 has predetermined protrusions and predetermined depressions.

The front substrate section 1 and the rear substrate section 2 are provided such that the transparent electrode 13 faces the transparent electrode 24. The liquid crystal layer 3 is provided in a space between the transparent electrode 13 and the transparent electrode 24. In the front substrate section 1 and the rear substrate section 2, alignment layers (not illustrated) on which a predetermined alignment process is performed are provided on inner faces of the respective transparent electrodes 13 and 24. The liquid crystal layer 3 is filled between the front substrate section 1 and the rear substrate section 2, and sealed by a seal 4, which has a shape of frame.

Further, a light source 5 is provided on a side face of the transparent substrate 21 in the rear substrate section 2. In other words, the liquid crystal display panel according to Embodiment 1 is to be applied to the backlight-type structure in which the transparent substrate 21 is used as the light guide for the light source 5.

An arbitrary transparent substrate may be used as the pair of transparent substrates 11 and 21 in the liquid crystal display panel. For example, a transparent glass substrate, such as soda glass and nonalkali glass, or a plastic substrate made of organic resin (e.g., epoxy resin, acrylic resin), polyethersulfone and the like may be used.

Note that, in order to efficiently propagate, through the inside of the substrate, light from the light source 5 provided on the side face of the transparent substrate 21, it is preferable to use a substrate that is highly transparent. In the case of the glass substrate, it is preferable to use nonalkali glass. Further, in order to achieve a substrate that is thinner in shape and lighter in weight, it is preferable to use organic resin as a material of the transparent substrates. In view of transparency, it is more preferable to use acrylic resin as the material of the transparent substrates.

The following describes principals of display of the liquid crystal display apparatus according to Embodiment 1, with reference to FIG. 1. In the description below, the light emitted from the light source 5 provided on the side face of the transparent substrate 21 is categorized into two types: light that directly enters a front face (on the first optical-path changing layer 22 side) of the transparent substrate 21 (optical path A); and light that directly enters the rear face (on the polarizer 25 side) of the transparent substrate 21 (optical path B).

The following describes the light passing along the optical path A.

The light passing along the optical path A travels as follows. After emitted from the light source 5 provided on the side face of the transparent substrate 21, light enters an interface of the transparent substrate 21 and the first optical-path changing layer 22. Note that, in order to allow the light to transmit through the first optical-path changing layer 22 without causing reflection or refraction, it is preferable that the refractive index of the first optical-path changing layer 22 be substantially the same as or smaller than the refractive index of the transparent substrate 21. In the subsequent part of the optical path, however, the light enters the transparent substrate 21 from the first optical-path changing layer 22, and it is necessary not to cause reflection or refraction when the light enters the transparent substrate 21. Therefore, it is most preferable that the refractive index of the transparent substrate 21 be substantially same as the refractive index of the first optical-path changing layer 22.

Note that it is not necessary for the transparent substrate 21 and the first optical-path changing layer 22 to be provided in a form of separate components, and they may be integrally provided in a form of one component. In the case where the transparent substrate 21 and the first optical-path changing layer 22 are integrally provided in the form of one component, no interface exists between the transparent substrate 21 and the first optical-path changing layer 22. Therefore, it becomes possible to completely eliminate unnecessary reflection or refraction that may have occurred at the interface.

The light thus transmitted through the first optical-path changing layer 22 then enters an interface of the first optical-path changing layer 22 and the low refractive-index layer 23. At this time, the light that enters the interface, i.e., incident light, is reflected totally at the interface by the protrusions and the depressions of the first optical-path changing layer 22. This total reflection causes the incident light to return toward the rear-face side. At the same time, a traveling direction of the incident light is changed in such a way that an angle of the light after the reflection becomes closer in the direction of a normal line of the substrate than an angle of the light before the reflection.

Figure 2:
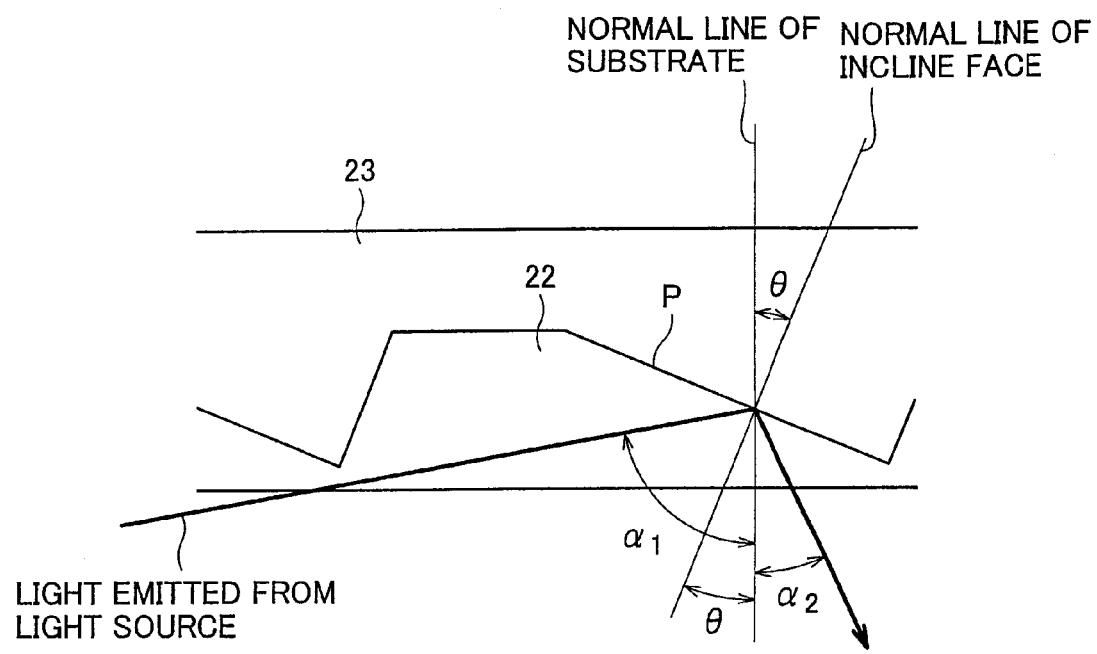
FIG. 2 is a diagram illustrating how light is reflected at an interface of a first optical-path changing layer and a low refractive-index layer in the liquid crystal display apparatus.

The following describes the protrusions and the depressions of the first optical-path changing layer 22, with reference to FIG. 2. Specifically, the following describes the protrusions and the depressions at the interface of the first optical-path changing layer 22 and the low refractive-index layer 23.

It is important that the first optical-path changing layer 22 has an incline face P shown in FIG. 2. A normal line of the incline face P is inclined at an angle $\theta$ with respect to the normal line of the substrate. This inclination allows the incline face P to directly accept the light emitted from the light source 5. Further, the protrusions and the depressions of the first optical-path changing layer 22 are arranged such that, in the case where the light emitted from the light source 5 directly enters the front face (on the first optical-path changing layer 22 side) of the transparent substrate 21, the light always enters via the incline face P.

It is necessary to reflect totally, at the incline face P of the interface of the first optical-path changing layer 22 and the low refractive-index layer 23, the light emitted from the light source 5. For this reason, the refractive index of the low refractive-index layer 23 is set lower than the refractive index of the first optical-path changing layer 22.

Furthermore, an incident angle of the light with respect to the incline face P needs to be greater than a critical angle at the incline face P of the interface. Suppose that an incident angle, at the incline face P with respect to the normal line of the substrate, of the light before the reflection is $\alpha_1$, and an exit angle, at the incline face P with respect to the normal line of the substrate, of the light after the reflection is $\alpha_2$. In this case, the incident angle of the light with respect to the incline face P is $(\alpha_1-\theta)$. The value $\theta$ is set in accordance with the formula below:

$$\alpha_1-\theta > \sin(n_{23}/n_{22}) = \text{(critical angle at the incline face } P \text{ of the interface)}$$

where $n_{22}$ indicates the refractive index of the first optical-path changing layer 22, whereas $n_{23}$ indicates the low refractive-index layer 23. Note that the light before the reflection by the incline face P is substantially orthogonal to the normal line of the substrate, although the quantity of the light may fluctuate depending upon the distance from the light source 5, and therefore it is possible to approximate $\alpha_1$ as $\alpha_1=90°$.

Further, in comparison of the light before the reflection by the incline face P with the light after the reflection by the incline face P, $$\alpha_1-\theta=\alpha_2+\theta$$

is satisfied, and therefore $$\alpha_2=\alpha_1-2\theta$$

is satisfied. It is apparent from the above formula that the traveling direction of the light after the reflection by the incline face P is changed in such a way that the angle of the light after the reflection by the incline face P is closer in the direction of the normal line of the substrate than the light before the reflection by the incline face P.

In the case where the material of the first optical-path changing layer 22 is commonly-used glass (with refractive index of 1.52), and the material of the low refractive-index layer 23 is magnesium difluoride (with refractive index of 1.28), which has a lowest refractive index at the practical level, the critical angle of the incline face P at the interface is approximately 57°. In this case, the tilt angle $\theta$ of the incline face P is set lower than 33°, and the tilt angle $\theta$ varies, along with variation of the refractive index of the material of the low refractive-index layer 23, in the range of $0° < \theta < 33°$. Further, in order to efficiently cause the total reflection at the interface, it is preferable that the difference between the refractive index of the first optical-path changing layer 22 and the refractive index of the low refractive-index layer 23 be 0.05 or greater. Accordingly, it is more preferable that the tilt angle $\theta$ be in the range of $15° < \theta < 33°$.

Further, with regard to the shapes of the protrusions and the depressions of the first optical-path changing layer 22, it is not necessary to particularly limit a tilt angle of faces other than the incline face P, and it is possible to set the tilt angle arbitrarily.

Note that, although the first optical-path changing layer 22 in FIG. 1 is illustrated in such a way that the incline faces P are provided at an equal pitch, it is not necessary to form the incline faces P at an equal pitch, and the pitch may be changed depending upon the distance from the light source 5. In the case where the incline faces P are provided at an equal pitch, the light quantity distribution tends to be wider at where the distance from the light source 5 is shorter, whereas the light quantity distribution P tends to be narrower at where the distance from the light source 5 is longer. For this reason, in order to correct such ununiformity in the light quantity distribution due to the distance from the light source, the incline faces P may be arranged such that the pitch of the incline face P is larger at where the distance from the light source 5 is short, whereas the pitch is smaller at where the distance from the light source 5 is long. Furthermore, the tilt angles θ of the incline faces P may be differentiated, depending upon the distance from the light source 5, to accommodate a fluctuation in the incident angle $\alpha_1$ of the incident light. For example, the tilt angle θ may be arranged such that the tilt angle θ is set small at where the distance from the light source 5 is short, whereas the tilt angle θ is set large at where the distance from the light source 5 is long.

After emitted from the light source 5 and reflected at the interface of the first optical-path changing layer 22 and the low refractive-index layer 23, the light transmits through the transparent substrate 21 again. Thereafter, the light is linearly polarized, in a desired direction, by the polarizer 25 provided on the rear-face side, and then enters the second optical-path changing layer 26.

After having entered the second optical-path changing layer 26, the light is reflected at an outer face (interface of the second optical-path changing layer 26 and, for example, an airspace outside of the second optical-path changing layer 26) of the second optical-path changing layer 26, and returns to the front-face side. After reflected at the outer face of the second optical-path changing layer 26, the light transmits through the polarizer 25, the transparent substrate 21, the first optical-path changing layer 22, the low refractive-index layer 23, the liquid crystal layer 3, and the front substrate section 1. Thereafter, the light exits toward the observer side, acting as display light.

Further, the outer face of the second optical-path changing layer 26 includes protrusions and depressions, in the same manner as the first optical-path changing layer 22. Therefore, there may be a case where the angle of the traveling direction of the light reflected at the outer face of the second optical-path changing layer 26 changes depending upon where the light is reflected. The protrusions and depressions of the second optical-path changing layer 26 will be described below, but it should be noted that shapes of at least the protrusions and depression of the second optical-path changing layer 26 need to be suitably arranged with the consideration of the reflective function with respect to the light that travels along the optical path A.

The following describes light that passes along the optical path B.

The light that passes along the optical path B travels as follows. After emitted from the light source 5 provided on the side face of the transparent substrate 21, light enters the interface of the transparent substrate 21 and the second optical-path changing layer 26. Note that, in order to allow light to transmit the second optical-path changing layer 26 without causing reflection or refraction, it is preferable that the refractive index of the second optical-path changing layer 26 be either substantially the same as or smaller than the refractive index of the transparent substrate 21. In the subsequent part of the optical path, however, the light enters the transparent substrate 21 from the second optical-path changing layer 26, and the light needs to enter without causing reflection or refraction. Therefore, it is most preferable that the refractive index of the transparent substrate 21 and the refractive index of the second optical-path changing layer 26 be substantially the same.

After having transmitted through the second optical-path changing layer 26, the light then enters the outer face (interface of the second optical-path changing layer 26 and, for example, an airspace outside of the second optical-path changing layer 26) of the second optical-path changing layer 26. At this time, the incident light is reflected totally at the outer face by the protrusions and the depressions of the second optical-path changing layer 26. This reflection causes the incident light to return toward the front-face side. At the same time, a traveling direction of the light is changed in such a way that an angle of the light after the reflection becomes closer in the direction of a normal line of the substrate than an angle of the light before the reflection.

Note that the protrusions and the depressions of the second optical-path changing layer 26 cause a similar function to the protrusions and the depressions of the first optical-path changing layer 22 described above. Accordingly, it is possible for the second optical-path changing layer 26 to adapt protrusions and depressions that have the same shape as those of the first optical-path changing layer 22. However, the optical path A and the optical path B are different in optical path conditions (e.g., the number of reflections before emitted toward the observer side) after a first reflection at the first optical-path changing layer 22 or the second optical-path changing layer 26. For this reason, it is preferable that the shapes of the first optical-path changing layer 22 and the second optical-path changing layer 26 be arranged in such a way that optimum light exits both in the case of the optical path A and in the case of the optical path B. The shapes of the protrusions and the depressions of the first optical-path changing layer 22 do not need to be the same as those of the second optical-path changing layer 26.

After reflected at the outer face of the second optical-path changing layer 26, the light transmits through the polarizer 25, the transparent substrate 21, the first optical-path changing layer 22, the low refractive-index layer 23, the liquid crystal layer 3, and the front substrate section 1. Thereafter, the light exits toward the observer side, acting as display light.

As described above, in the liquid crystal display apparatus according to Embodiment 1, the first optical-path changing layer 22 and the low refractive-index layer 23 are provided on the front-face side of the transparent substrate 21. This causes the light emitted from the light source 5 and directly entering the front face (first optical-path changing layer 22 side) of the transparent substrate 21 to be reflected totally at the interface of the first optical-path changing layer 22 and the low refractive-index layer 23 and thus return toward the rear-face side. At this time when the light is reflected totally, the traveling direction of the light is changed in such a way that an angle of the light after the reflection becomes closer in the direction of a normal line of the substrate than an angle of the light before the reflection. The light thus returned toward the rear-face side is reflected by the second optical-path changing layer 26 and then emitted toward the observer side.

With the above function, in the liquid crystal display apparatus according to Embodiment 1, the light emitted from the light source 5 is reflected while maintaining the horizontal direction with respect to the substrate. Therefore, no light exits from a side face that is opposite to the side face on which the light source is provided in the liquid crystal display apparatus of Embodiment 1, compared to a conventional structure which does not include the first optical-path changing layer

22. This makes it possible to improve efficiency in utilizing the light emitted from the light source 5, and therefore display a bright and suitable image.

Further, components that form the protrusions and the depressions of the first optical-path changing layer 22 and the protrusions and the depressions of the second optical-path changing layer 26 may be arranged to have the following shapes. For example, the protrusions and the depressions are arranged in stripe in such a way that a face of the protrusions and the depressions is opposite to the face on which the light source 5 is provided to emit light. It is also possible to arrange the protrusions and the depressions with a triangular pyramid shape, a quadrangular pyramid shape, a cone shape, a polygonal structure or the like, in such a way that a face of the protrusions and the depressions is opposite to the face from which light is emitted.

In the case where the protrusions and the depressions are formed of components that have the shape of protrusions and depressions in stripe, there is an advantage that it is easy to produce the first optical-path changing layer 22 and the second optical-path changing layer 26. In this case, however, the faces (i.e., face P in FIG. 2) opposite to the face from which light is emitted are provided in stripe. This may cause stripe-shape unevenness in intensity of the light entering the liquid crystal layer 3.

On the other hand, in the case where the protrusions and the depressions are formed of components that have a triangular-pyramid shape, a quadrangular-pyramid shape, a cone shape, a polygonal structure or the like, no stripe-shape unevenness would occur in the intensity of the light entering the liquid crystal layer 3. Therefore, a more uniform intensity-distribution of incident light is obtained.

Further, it is preferable that a front-side end part of the light source 5 provided on the side face of the first transparent substrate 21 be provided so as not to protrude, toward the front-face side, from the interface of the transparent substrate 21 and the first optical-path changing layer 22. If the end part of the front-face side of the light source 5 protrudes, toward the front-face side, from the interface of the transparent substrate 21 and the first optical-path changing layer 22, light would enter from a side face of the components such as the first optical-path changing layer 22 and the low refractive-index layer 23. Such light may reflect in an unintended manner at an interface of the components and exit toward the observer side. This generates excess light leakage and thus degrades the contrast.

If the light source 5 provided on the side face of the first transparent substrate 21 is provided such that the end part of the front-face side of the light source 5 does not protrude, toward the front-face side, from the interface of the transparent substrate 21 and the first optical-path changing layer 22, it becomes possible to prevent the unintended light leakage described above and therefore obtain a suitable image whose contrast is not degraded.

Further, a reflective sheet made of organic resin or the like may be provided, or a total-reflection film made of metal thin film may be provided, on a rear-face side of the second optical-path changing layer 26. By this way, it becomes possible to return the light transmitted through the second optical-path changing layer 26 back to the observer side again, and therefore the light emitted from the light source 5 is used as display light without loss.

Figure 3:
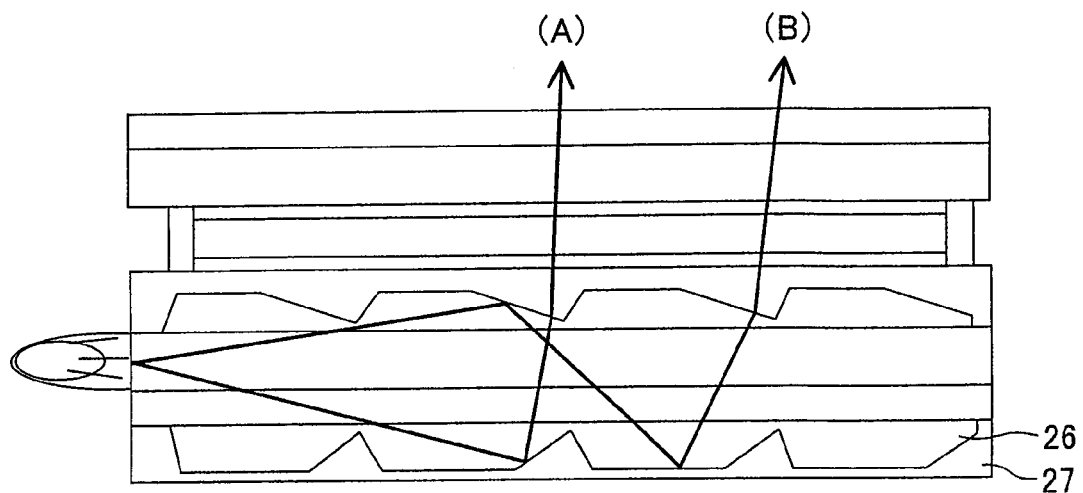
FIG. 3 is a cross sectional diagram schematically illustrating a structure of another liquid crystal display apparatus according to Embodiment 1.

Note that the reflective sheet generally has a thickness of approximately 0.1 to 0.2 mm. Therefore, in view of achieving a thinner shape, it is preferable that a total-reflection film 27 made of metal thin film be provided on the rear-face side of the second optical-path changing layer 26, as shown in FIG. 3.

For such total-reflection film 27, it is possible to use a metal thin film made of an alloy of aluminum, gold, silver, copper, chromium, molybdenum, titanium, palladium and the like.

Embodiment 2

Figure 4:
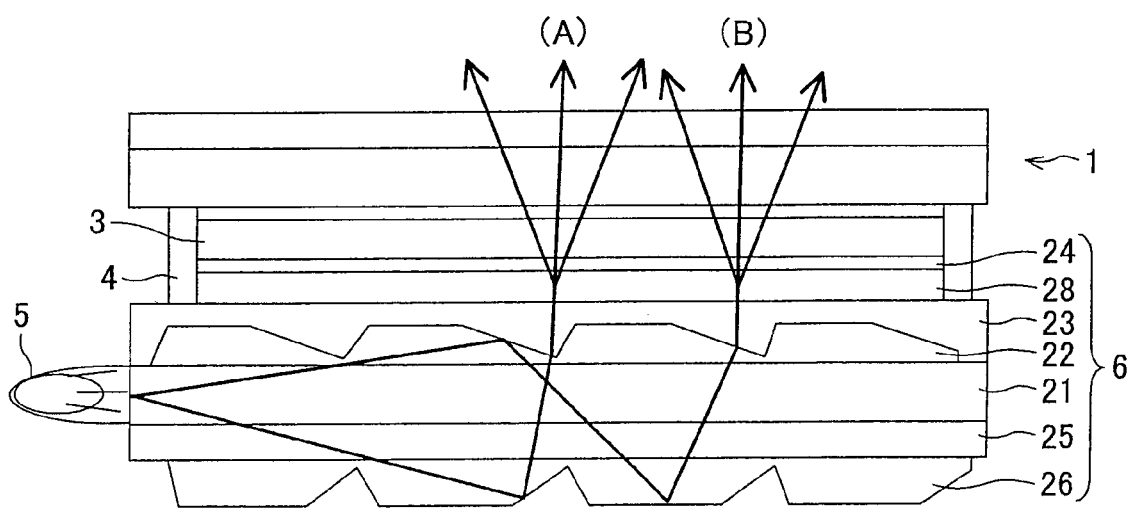
FIG. 4 is a cross sectional diagram schematically illustrating a structure of a liquid crystal display apparatus according to Embodiment 2.

FIG. 4 is a cross sectional diagram schematically illustrating a structure of a liquid crystal display apparatus according to Embodiment 2. The liquid crystal display apparatus according to Embodiment 2 has a similar structure to the liquid crystal display apparatus of Embodiment 1. Therefore, the same reference numerals are given to the components that have the same structure as in FIG. 1, and specific description thereof is omitted.

The liquid crystal display illustrated in FIG. 4 employs a rear-face side substrate 6 in place of the rear substrate section 2 illustrated in FIG. 1. The rear-face side substrate 6 is different from the rear substrate section 2 in that a light scattering layer 28 is provided between the low refractive-index layer 23 and the transparent electrode 24.

In the liquid crystal display apparatus, after light is emitted from the light source 5, the optical path of the light is changed toward the observer side as indicated by the paths (A) and (B) in FIG. 4, due to functions of the first optical-path changing layer 22, the low refractive-index layer 23, and the second optical-path changing layer 26. Then, the light enters the light scattering layer 28. The light goes along the same path in the rear-face side substrate 6 as in the rear substrate section 2, before entering the light scattering layer 28.

The light scattering layer 28 gives scattering effects to light that is condensed in the front direction on the observer side due to the functions of the first optical-path changing layer 22, the low refractive-index layer 23, and the second optical-path changing layer 26. Therefore, with the liquid crystal display apparatus of Embodiment 2 that includes the light scattering layer 28, it becomes possible to eliminate dispersion in the luminance distribution in the face of the substrate and obtain a suitable display.

Further, although the light scattering layer 28 is additionally provided as a directly-above layer of the low refractive-index layer 23 in Embodiment 2, the position of the light scattering layer 28 is not particularly limited to this structure. The light scattering layer 28 may be provided in a space between any layers, as long as the light scattering layer 28 is provided between the transparent substrate 11 and the transparent substrate 21. Further, in the case where a color filter is provided, it is possible to give a characteristic of scattering light to the color filter or an overcoat for flattening the color filter.

Exemplary methods of giving the characteristic of scattering light include: a method including the step of dispersing, in a light scattering layer, inorganic particles, such as fine particles of alumina and fine particles of silica, so as to give the characteristic of scattering light; and a method including the step of dispersing organic fine particles by utilizing a cross linking reaction of macromolecule monomer so as to give the characteristic of scattering light.

Embodiment 3

Figure 5:
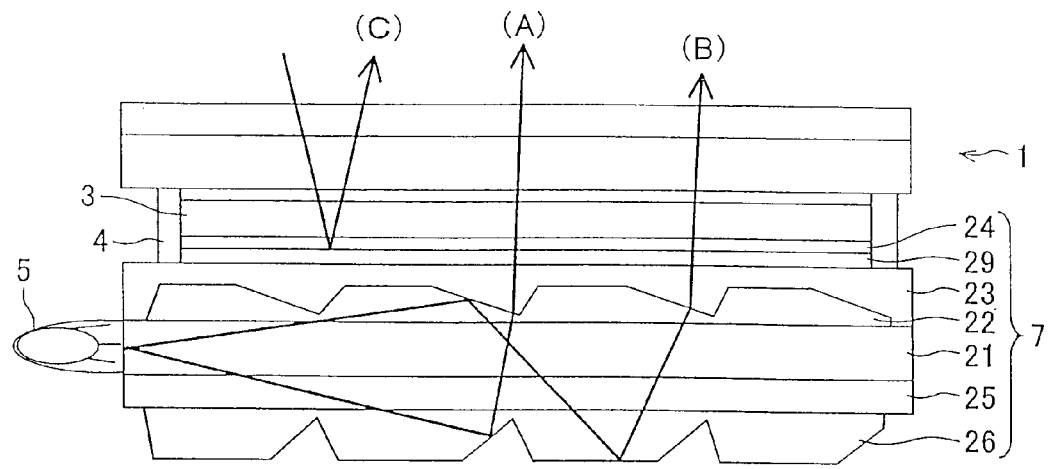
FIG. 5 is a cross sectional diagram schematically illustrating a structure of a liquid crystal display apparatus according to Embodiment 3.
Figure 6:
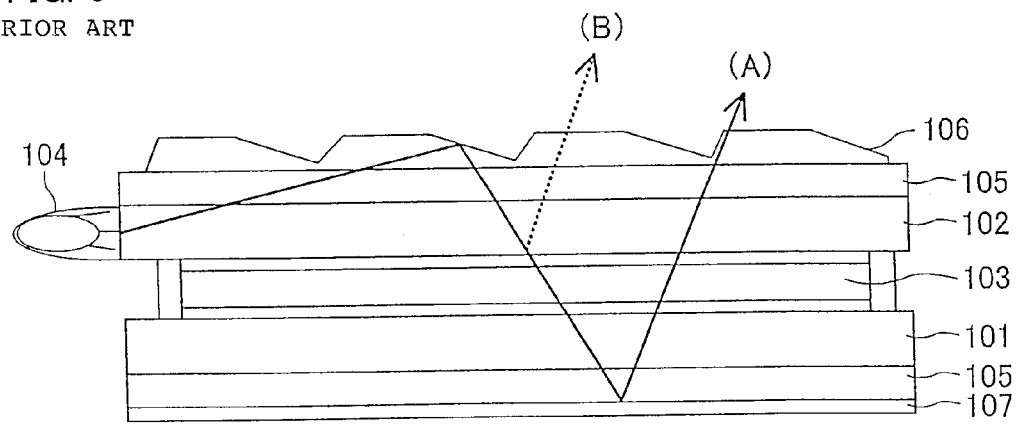
FIG. 6 is a cross sectional diagram illustrating an exemplary structure of a conventional liquid crystal display apparatus.

FIG. 5 is a cross sectional diagram schematically illustrating a structure of a liquid crystal display apparatus according to Embodiment 3. The liquid crystal display apparatus according to Embodiment 3 has a similar structure as to the liquid crystal display apparatus according to Embodiment 1. Therefore, the same reference numerals are given to the components that have the same structure as in FIG. 1, and specific description thereof is omitted.

The liquid crystal display apparatus illustrated in FIG. 5 employs a rear-face side substrate 7 in place of the rear substrate section 2 illustrated in FIG. 1. The rear-face side substrate 7 is different from the rear substrate section 2 in that a transflective reflection film 29 is provided between a low refractive-index layer 23 and a transparent electrode 24.

Note that the transflective reflection film 29 may be provided with the use of a half-mirror type transflective reflection film, which can be obtained by adjusting the layer thickness of the metal thin film, a transflective reflection film that is made of a total-reflective metal thin film including an aperture, or the like. This metal thin film may be provided with the use of a metal alloy of aluminum, gold, silver, copper, chromium, molybdenum, titanium, palladium and the like.

With the liquid crystal display apparatus, it is possible to display in a reflection display mode or in a transmission display mode where the light source 5 is turned on for displaying.

First, the following describes the transmission display mode. In the transmission display mode, after light is emitted from the light source 5, the optical path of the light is changed toward the observer side, as indicated by paths (A) and (B) in FIG. 5, due to functions of the first optical-path changing layer 22, the low refractive-index layer 23, and the second optical-path changing layer 26. Thereafter, the light enters the transflective reflection film 29. The light goes along the same path in the rear-face side substrate 7 as in the rear substrate section 2, before entering the transflective reflection film 29. Among the light that travels along the path (A) or the path (B) and then enters the transflective reflection film 29, light that transmits through the transflective reflection film 29 is used as display light.

The following describes the reflection display mode. As shown by path (C) in FIG. 5, outside light from the observer side transmits through the front substrate section 1 and then enters the liquid crystal layer 3. The outside light thus entered the liquid crystal layer 3 then enters the transflective reflection film 29, is reflected by the transflective reflection film 29, and exits toward the observer side, acting as reflective displaying.

Further, a dielectric multi-layer film in which dielectrics each having a different refractive index are laminated may be used as the transflective reflection film 29. It is also possible in this case to use the liquid crystal display apparatus as a transflective liquid crystal display apparatus in which the transmission display mode and the reflection display mode are switched in displaying, in the same manner as in the case where the metal thin film is used as the transflective reflection film 29.

Examples of the low refractive-index dielectric include alumina ($Al_2O_3$), silicon dioxide ($SiO_2$), and magnesium difluoride ($MgF_2$). Examples of the high refractive-index dielectric include titanium dioxide ($TiO_2$), zirconium dioxide ($ZrO_2$), zinc selenide (ZnSe), and zinc sulfide (ZnS). The low refractive-index dielectric and the high refractive-index dielectric are laminated in order to form the dielectric multi-layer film.

Note that, although a color filter, a protective film, an insulating film and the like are not particularly illustrated in the liquid crystal display apparatus of any of Embodiment 1 to 3, such component may be provided on the transparent substrate if necessary.

Further, a driving method of the liquid crystal display apparatus of the present invention is not limited to a particular method, and an active matrix method, a passive matrix method, or other method may be arbitrarily selected.

Further, the light emitted from the light source 5 is categorized into two types in Embodiments 1 to 3: light that travels along the path (A), and light that travels along the path (B). The light that travels along the path (A) or the path (B), among all the light emitted from the light source 5, contributes to the displaying in a most suitably manner. However, it is impossible, or difficult, to arrange the first optical-path changing layer 22 and the second optical-path changing layer 26 such that the light emitted from the light source 5 always travels along the path (A) or the path (B).

It is considered that there may be a case where a part of the light emitted from the light source 5 is reflected again and again for a plurality of times between the first optical-path changing layer 22 and the second optical-path changing layer 26, and reflected by a side face of the transparent substrate 21. Further, there may be a case where the light emitted from the light source 5 exits from the rear-face side substrate, without being reflected in a desired manner, while widely inclining with respect to the direction of the normal line of the substrate.

Nevertheless, it is possible to increase a proportion of the light that travels along the path (A) or the path (B), among all the light emitted from the light source 5, by appropriately arranging the protrusions and the depressions of the first optical-path changing layer 22 and the protrusions and the depressions of the second optical-path changing layer 26. As such, it is absolutely possible to display more brightly than a conventional display.

The following describes evaluation of the liquid crystal display apparatus according to the present embodiment.

EXAMPLE 1

In Example 1, a liquid crystal display apparatus with the structure illustrated in FIG. 1 was produced by the method below. In the example, nonalkali glass with a refractive index of 1.52 was used as the transparent substrate 11 provided on the observer side and the transparent substrate 21 provided on the rear-face side.

First of all, the transparent electrode 13 made of ITO was provided on the transparent substrate 11. This was followed by printing soluble polyimide on the transparent electrode 13, and then baked. Thereafter, an alignment process was performed by rubbing an alignment layer face so as to obtain a predetermined alignment direction. By this way, a substrate to be provided on the observer side was obtained.

Then, the first optical-path changing layer 22 was provided on the transparent substrate 21. Specifically, an acrylic nega-resist transfer film was transferred onto the transparent substrate 21 under high temperature. The acrylic nega-resist transfer film had been shaped by using a mold provided in advance in a predetermined shape (quadrangular-pyramid shape in the present example). Then, the transparent substrate 21 with the acrylic nega-resist transfer film thus transferred was exposed to ultraviolet so as to be hardened. Then, a low refractive-index layer 23 was provided on an upper layer of the first optical-path changing layer 22 with the use of a low refractive index material HF-707 (product name; manufactured by Hitachi Chemical Co., Ltd.).

A color filter of three colors, R(red)G(green)B(blue), was provided on an upper layer of the low refractive-index layer 23, and a planarized layer made of thermoset resin was provided thereon (the color filter and the planarized layer are not illustrated in FIG. 1).

A transparent electrode 24 made of ITO was provided on an upper layer of the planarized layer. An alignment layer was provided on an upper layer of the transparent electrode 24 and a rubbing process was performed on the alignment layer, in the same manner as in the observer side-side substrate 2. By this way, a rear-face side substrate was obtained.

The transparent substrate 11 to be provided on the observer side and the transparent substrate 21 to be provided on the rear-face side, both of which were obtained as described above, were provided in the vicinity of the seal 4, which is in frame-shape. Then, the transparent electrodes 13 and 24 made of ITO were adhered such that they face each other. Thereafter, ZLI-4792 (product name: manufactured by Merck Ltd. Japan), which is nematic liquid crystal, was sealed therein, forming the liquid crystal layer 3.

SEG-1425DU (product name; manufactured by Nitto Denko Corporation) was adhered, as polarizers 12 and 25, on the pair of transparent substrates 11 and 21 such that orientation directions of the alignment layers provided on the respective substrates match with transmission axes of the polarizers.

Then, a second optical-path changing layer 26 was adhered onto the rear-side face of the polarizer 25. The second optical-path changing layer 26 was made of acrylic resin that was provided with the use of a mold in which a predetermined pattern of protrusions and depressions (quadrangular-pyramid pattern in the present example) had been provided in advance.

Thereafter, a light source 5 including three pieces of LED was provided on a side face of the transparent substrate 21 in the liquid crystal display panel obtained in the manner as described above. By this way, the liquid crystal apparatus of Example 1 was obtained.

EXAMPLE 2

In Example 2, the liquid crystal display apparatus with the structure illustrated in FIG. 3 was produced. Specifically, a total-reflection film 27 was provided on a rear-face side of the second optical-path changing layer 26 in the liquid crystal display apparatus mentioned in Example 1, in such a way as to have the layer thickness of 1000 Å. The total-reflection film 27 is made of an alloy containing silver and palladium at 98:2 (ratio by weight). By this way, the liquid crystal apparatus of Example 2 was obtained.

EXAMPLE 3

In Example 3, the liquid crystal display apparatus with the structure illustrated in FIG. 4 was produced. Specifically, "RF series" (product name: manufactured by Hitachi Chemical Co., Ltd.), which is a transfer film made of acrylic resin material, was provided on an upper layer (on the front-face side) of the low refractive-index layer 23 in the liquid crystal display apparatus mentioned in Example 1, thereby forming a light scattering layer 28. By this way, the liquid crystal apparatus of Example 3 was obtained.

EXAMPLE 4

In Example 4, a liquid crystal display apparatus with the structure of FIG. 5 was produced. Specifically, a transflective reflection film 29 made of a metal thin film formed of an alloy of silver and palladium at silver:palladium=98:2 was provided on an upper layer (on the front-face side) of the low refractive-index in the liquid crystal display apparatus mentioned in Example 1, in such a way as to have the layer thickness of 280 Å and satisfy the following formula: reflectivity:transmissivity=7:3. By this way, the liquid crystal apparatus of Example 4 was obtained.

EXAMPLE 5

In Example 5, the liquid crystal display apparatus with the structure illustrated in FIG. 5 was produced. Specifically, three dielectric multi-layer films made of $SiO_2$ and $TiO_2$ were laminated on an upper layer (on the front-face side) of the low refractive-index layer 23 in the liquid crystal display apparatus mentioned in Example 1, thereby forming the transflective reflection film 29. By this way, the liquid crystal apparatus of Example 5 was obtained.

COMPARATIVE EXAMPLE 1

Figure 7:
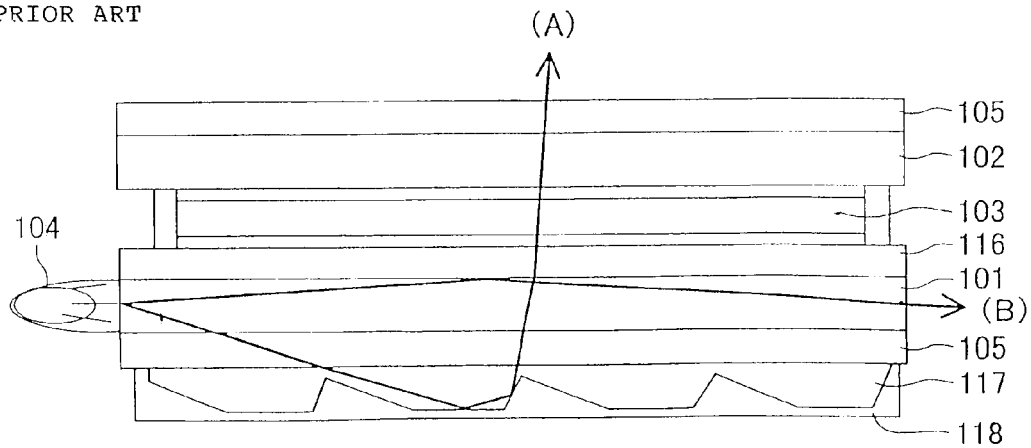
FIG. 7 is a cross sectional diagram illustrating an exemplary structure of a conventional liquid crystal display apparatus.

In Comparative Example 1, the liquid crystal display apparatus with the structure illustrated in FIG. 7 was produced. Specifically, the first optical-path changing layer 22 including protrusions and depressions was not provided in the liquid crystal display apparatus mentioned in Example 1, and instead, the low refractive-index layer 23 (low refractive-index layer 116 in FIG. 7) was provided directly on the transparent substrate 21 (transparent substrate 101 in FIG. 7). By this way, the liquid crystal apparatus of Comparative Example 1 was obtained.

[Evaluation Results]

The following presents the results of evaluating the liquid crystal display apparatuses that were produced in the manners as described in respective Examples 1 to 5 and Comparative Example 1.

First, the following describes the results of evaluating luminances and dispersions in in-plane luminance (display quality: visual determination of unevenness in luminance) of the transmissive liquid crystal display apparatuses of Example 1 to 3 and Comparative Example 1, in the case where the liquid crystal layer is in a sate where no voltage is applied (normally-white). The luminances were measured by using a colorimeter BM5 (product name: manufactured by TOPCON corporation) at the viewing angle of 2°.

TABLE 1

|  | EXAMPLE 1 | EXAMPLE 2 | EXAMPLE 3 | COMPARATIVE EXAMPLE 1 |
|---|---|---|---|---|
| LUMINANCE | 115 cd | 125 cd | 108 cd | 75 cd |
| DISPLAY QUALITY | AVERAGE | AVERAGE | GOOD | AVERAGE |

It is apparent from Table 1 that the respective liquid crystal display apparatuses of Examples 1 to 3 allow light emitted from the light source to exit toward the observer side more efficiently than the liquid crystal display apparatus of Comparative Example 1, and therefore the luminance is improved significantly.

Further, it can be said from comparison of Example 1 with Example 2 that, if a total-reflection film 27 made of metal thin film is provided on a rear face of the second optical-path changing layer 26, reflection efficiency is improved at the second optical-path changing layer 26, and therefore the luminance is improved. This makes it possible to display a more suitable and bright image.

Further, it can be said from comparison of Example 1 with Example 3 that, if a light scattering layer 28 is provided on an upper layer of the low refractive-index layer 23, in-plane luminance distribution is uniformed. This makes it possible to display a bright and suitable image without unevenness in luminance of the face.

Further, it was confirmed in a dark place how the respective transflective liquid crystal display apparatuses of Examples 4 and 5 display. As a result, it was confirmed that light from the LED light source provided on the side face of the rear-face side transparent substrate was efficiently provided toward the observer side, and therefore a bright image of transmissive display was displayed.

Further, the LED light source was turned off, and the display was conducted with the use solely of outside light. A suitable reflective display was obtained both in Example 4 (transflective reflection film made of metal thin film) and in Example 5 (transflective reflection film made of dielectric multi-layer film).

As described above, a liquid crystal display panel including a liquid crystal layer filled between a pair of transparent substrates, the liquid crystal display panel further includes: a first optical-path changing layer, on a front-face side of a rear-face side transparent substrate, that has a refractive index substantially equal to a refractive index of the rear-face side transparent substrate, and that includes a predetermined protrusion and a predetermined depression, the rear-face side transparent substrate being one of the pair of transparent substrates that is provided on a side which becomes a rear side when an observer views the liquid crystal display panel; a low refractive-index layer, on a front-face side of the first optical-path changing layer, that is in contact with the predetermined protrusion and the predetermined depression of the first optical-path changing layer, and that has a refractive index that is smaller than the refractive index of the first optical-path changing layer; and a second optical-path changing layer, on a rear-face side of the rear-face side transparent substrate, that includes a predetermined protrusion and a predetermined depression.

In the above structure, the liquid crystal display panel employed in the backlight-type liquid crystal display apparatus, which has the light source provided on the side face of the rear-face side transparent substrate so as to realize a thinner shape, includes, on the front-face side of the rear-face side transparent substrate, the first optical-path changing layer and the low refractive-index layer that include predetermined protrusion and predetermined depression.

If the protrusion and the depression of the first optical-path changing layer are designed to have appropriate shapes, the following functions are obtained at the interface of the first optical-path changing layer and the low refractive-index layer: (A) a function of carrying out a total reflection with respect to incident light that directly comes from the light source (close to the horizontal), to change the incident light into light that is closer in the direction of the normal line of the substrate; and (B) transmitting incident light that is close to the direction of the normal line of the substrate.

Further, if the protrusion and the depression of the second optical-path changing layer are designed to have appropriate shapes, it becomes possible to change the light directly coming from the light source into the light that is closer in the direction of the normal line of the substrate, and reflect the light thus changed.

Specifically, the light emitted from the light source is first reflected by the protrusion and the depression of the first optical-path changing layer, or the protrusion and the depression of the second optical-path changing layer. At this time, the light, which is close to the horizontal, is changed into light that is closer in the direction of the normal line of the substrate. This prevents the light from exiting via an opposite face to the side face on which the light source is provided, in the rear-face side transparent substrate. Therefore, it becomes possible to reduce the loss of the light emitted from the light source, and display a bright image. After emitted from the light source, light is first reflected by the protrusion and the depression of the first optical-path changing layer. Then, the light is reflected by the protrusion and the depression of the second optical-path changing layer. Thereafter, the light transmits through the protrusion and the depression of the first optical-path changing layer. Finally, the light exits toward the observer side (front-face side).

Further, the liquid crystal display panel further includes a total-reflection film on a rear-face side of the second optical-path changing layer.

With the above structure, it becomes possible to prevent light from exiting via the rear-face side of the second optical-path changing layer. Therefore, the loss of the light emitted from the light source is more reduced, and a bright image is displayed.

Further, the liquid crystal display panel further includes at least one light scattering layer between the pair of transparent substrates.

With the above structure, it becomes possible to even, by the light scattering layer, in-plane luminance distribution of the light emitted from the light source, and then the light with a uniformed in-plane luminance distribution is provided to the observer side. This makes it possible to display a bright and suitable image without unevenness in luminance of the face.

Further, the liquid crystal display panel further includes a transflective reflection film on a front-face side of the low refractive-index layer.

With the above structure, it becomes possible to use the liquid crystal display panel as a transflective liquid crystal display panel.

Further, a liquid crystal display apparatus includes any one of the above liquid crystal display panels, the liquid crystal display apparatus further including a light source provided on at least one side face of the rear-face side transparent substrate.

With the above structure, it becomes possible to reduce the loss of the light emitted from the light source, and display a bright image, due to the same functions as the liquid crystal display panel described above.

Further, it is preferable in the liquid crystal display apparatus that a front-side end part of the light source be provided so as not to protrude, toward a front-face side, from an interface of the rear-face side transparent substrate and the first optical-path changing layer.

With the above structure, it becomes possible to prevent a defect that light enters from a side face of the components such as the first optical-path changing layer and the low refractive-index layer, and that such light is reflected in an unintended manner at an interface of the components and therefore exits toward the observer side. Therefore, a decrease in the contrast is prevented.

Further, a liquid crystal display apparatus includes a liquid crystal display panel including a liquid crystal layer filled between a pair of transparent substrates, and a light source provided on at least one side face of a rear-face side transparent substrate, the rear-face side transparent substrate being one of the pair of transparent substrates that is provided on a side which becomes a rear side when an observer views the liquid crystal display panel, the liquid crystal display apparatus including: a boundary surface, on a front-face side of the rear-face side transparent substrate, that includes a predetermined protrusion and a predetermined depression, the boundary surface having (i) a function of carrying out a total reflection with respect to incident light that directly comes from the light source, to change the incident light into light that is closer in the direction of a normal line of a substrate, and (ii) a function of transmitting incident light that is close to the direction of the normal line; and a reflective surface, on the rear-face side of the rear-face side transparent substrate, that includes a predetermined protrusion and a predetermined depression, the reflective surface having a function of reflecting incident light that directly comes from the light source, to change the incident light into light that is closer in the direction of the normal line of the substrate.

In the above structure, the light emitted from the light source is first reflected by the interface on the front-face side of the rear-face side transparent substrate, or the reflective surface on the rear-face side of the rear-face side transparent substrate. At this time, the light, which is close to the horizontal, is changed into light that is closer in the direction of the normal line of the substrate. This prevents the light from exiting via an opposite face to the side face on which the light source is provided in the rear-face side transparent substrate. Therefore, it becomes possible to reduce the loss of the light emitted from the light source, and display a bright image. After emitted from the light source, light is first reflected by the interface on the front-face side of the rear-face side transparent substrate. Then, the light is reflected by the reflective surface on the rear-face side of the rear-face side transparent substrate. Thereafter, the light transmits through the interface. Finally, the light exits toward the observer side (front-face side).

It is possible to reduce the loss of light emitted from a light source and display a bright image in a liquid crystal display panel and a liquid crystal display apparatus with which a thinner shape and a lighter weight are achieved. Accordingly, the present invention is applicable to mobile devices, such as mobile phones and PDA.

The invention claimed is:

1. A liquid crystal display panel comprising a liquid crystal layer filled between a pair of transparent substrates, the liquid crystal display panel further comprising:
a first optical-path changing layer, on a front-face side of a rear-face side transparent substrate, that has a refractive index substantially equal to a refractive index of the rear-face side transparent substrate, and that includes a predetermined protrusion and a predetermined depression, the rear-face side transparent substrate being one of the pair of transparent substrates that is provided on a side which becomes a rear side when an observer views the liquid crystal display panel;
a low refractive-index layer, on a front-face side of the first optical-path changing layer, that is in contact with the predetermined protrusion and the predetermined depression of the first optical-path changing layer, and that has a refractive index that is smaller than the refractive index of the first optical-path changing layer; and
a second optical-path changing layer, on a rear-face side of the rear-face side transparent substrate, that includes a predetermined protrusion and a predetermined depression.

2. The liquid crystal display panel according to claim 1, further comprising a total-reflection film on a rear-face side of the second optical-path changing layer.

3. The liquid crystal display panel according to claim 1, further comprising at least one light scattering layer between the pair of transparent substrates.

4. The liquid crystal display panel according to claim 1, further comprising a transflective reflection film on a front-face side of the low refractive-index layer.

5. A liquid crystal display apparatus including a liquid crystal display panel set forth in claim 1, the liquid crystal display apparatus further comprising:
a light source provided on at least one side face of the rear-face side transparent substrate.

6. The liquid crystal display apparatus according to claim 5, wherein a front-side end part of the light source is provided so as not to protrude, toward a front-face side, from an interface of the rear-face side transparent substrate and the first optical-path changing layer.

7. The liquid crystal display apparatus according to claim 5, further comprising a total-reflection film on a rear-face side of the second optical-path changing layer.

8. The liquid crystal display apparatus according to claim 5, further comprising at least one light scattering layer between the pair of transparent substrates.

9. The liquid crystal display apparatus according to claim 5 further comprising a transflective reflection film on a front-face side of the low refractive-index layer.

* * * * *